(12) United States Patent
Perkinson

(10) Patent No.: US 8,277,182 B2
(45) Date of Patent: Oct. 2, 2012

(54) REMOTE PITCH CONTROLLER FOR A VARIABLE PITCH PROPELLER

(75) Inventor: Robert H. Perkinson, Somers, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 581 days.

(21) Appl. No.: 12/497,363

(22) Filed: Jul. 2, 2009

(65) Prior Publication Data

US 2011/0002786 A1   Jan. 6, 2011

(51) Int. Cl.
    *B64C 11/06* (2006.01)
(52) U.S. Cl. .......... 416/1; 416/157 R; 416/158; 416/167
(58) Field of Classification Search .............. 416/1, 156, 416/157 R, 158, 163, 164, 167
    See application file for complete search history.

(56) References Cited

U.S. PATENT DOCUMENTS

| | | | |
|---|---|---|---|
| 4,175,636 A * | 11/1979 | Broughton | ............ 180/119 |
| 4,523,891 A * | 6/1985 | Schwartz et al. | ......... 416/157 R |
| 4,533,296 A | 8/1985 | Duchesneau et al. | |
| 4,810,164 A | 3/1989 | Wright | |
| 4,934,901 A | 6/1990 | Duchesneau | |
| 5,042,966 A | 8/1991 | Schwartz et al. | |
| 5,141,399 A | 8/1992 | Duchesneau et al. | |
| 5,174,718 A * | 12/1992 | Lampeter et al. | ............... 416/48 |
| 5,186,608 A * | 2/1993 | Bagge | ............. 416/37 |
| 5,897,293 A * | 4/1999 | Arel et al. | ......... 416/46 |
| 6,059,528 A | 5/2000 | Danielson et al. | |
| 6,077,040 A | 6/2000 | Pruden et al. | |
| 6,261,062 B1 | 7/2001 | Amerline et al. | |
| 6,422,816 B1 | 7/2002 | Danielson | |
| 6,511,292 B2 * | 1/2003 | Perkinson et al. | ............. 416/48 |
| 6,592,328 B1 | 7/2003 | Cahill | |
| 6,811,376 B2 | 11/2004 | Arel et al. | |
| 6,991,426 B2 | 1/2006 | Pietricola | |

* cited by examiner

*Primary Examiner* — Edward Look
*Assistant Examiner* — Andrew C Knopp
(74) *Attorney, Agent, or Firm* — Kinney & Lange, P.A.

(57) ABSTRACT

A system for adjusting the pitch of a variable pitch propeller has a hub assembly, a valve assembly, and a fluid supply assembly. The hub assembly comprises a hub rotatably driven by a propeller shaft, an actuator connected to the hub, and a plurality of propeller blades connected to the actuator with at least one mechanical connection. The valve assembly is in fluid communication with the valve assembly and the actuator. The fluid supply assembly comprises a valve control mechanism that is isolated from the valve assembly and the hub assembly. The valve control mechanism provides a variable hydraulic pressure control signal to the valve assembly, which transfers fluid to the actuator as a function of the variable hydraulic pressure control signal. Based on the fluid pressure in the actuator, the pitch of the propeller blades is adjusted.

23 Claims, 8 Drawing Sheets

REMOTE PITCH CONTROLLER FOR A VARIABLE PITCH PROPELLER

BACKGROUND

Variable pitch propeller systems typically include propeller blades mounted to a hub on a rotating side of the propeller system. The hub rotates with a propeller shaft. A propeller pitch change system uses hydraulic pressure, electrical current or mechanical motion to adjust the pitch of the propeller. Changing the pitch of the propeller blades requires communication of either an actuation mechanism or control signals across the interface between a non-rotating side of the propeller (e.g., the engine or hydraulic drive) and the rotating side of the propeller (e.g., the propeller pitch change actuator and propeller blades). To communicate between these two sides of the interface, complex systems using multiple components are often required. These systems are prone to leakage and wear, both of which can damage the propeller system. In addition, where variable pitch propeller systems are used in watercraft applications, the propeller pitch change system is often exposed to a harsh salt water environment, which can severely damage the propeller system.

SUMMARY

The present invention is a system for adjusting the pitch of a variable pitch propeller having a hub assembly, a valve assembly, and a fluid supply assembly. The hub assembly comprises a hub rotatably driven by a propeller shaft, an actuator connected to the hub, and a plurality of propeller blades connected to the actuator. The valve assembly is in fluid communication with the fluid supply assembly and the actuator. The fluid supply assembly comprises a valve control mechanism that is isolated from the valve assembly and the hub assembly. The valve control mechanism provides a variable hydraulic pressure control signal to the valve assembly, which transfers fluid to the actuator as a function of the variable hydraulic pressure control signal. Based on the fluid pressure in the actuator, the actuator adjusts the pitch of the propeller blades.

In another aspect of the invention, a method for adjusting the pitch of a variable pitch propeller for a watercraft in an aqueous environment is presented. An input current is sent to a valve control mechanism, which is isolated from the aqueous environment, to create a variable hydraulic pressure control signal that is a function of the input signal of the valve control mechanism. The variable hydraulic pressure control signal is transferred to a valve assembly. The valve assembly comprises a piston pilot valve, which is moved in a first axial direction relative to the variable hydraulic pressure control signal to transfer fluid to an actuator in communication with a blade of the variable pitch propeller. Fluid pressure then is increased in a first chamber of the actuator relative to a second chamber of the actuator to adjust the pitch of the blade.

DETAILED DESCRIPTION

In order to change the pitch of a propeller blade in a controllable manner, an electrical resolver has previously been used in communication with the hydraulic system at an end of a propshaft. However, in watercraft applications where the pitch propeller systems are often exposed to severe salt water conditions, such electrical components are routinely exposed to significant wear and corrosion. Therefore, it is desirable to have a pitch control system that has no electrical connections and minimal mechanical connections that can be exposed to such harsh conditions. The system of the present invention has a valve control mechanism isolated from these harsh conditions. The valve control mechanism sends a hydraulic pressure control signal to a valve assembly, which transfers fluid to an actuator within the propeller hub to adjust the pitch. The propeller blade angle is a function of the hydraulic pressure control signal.

Figure 1:
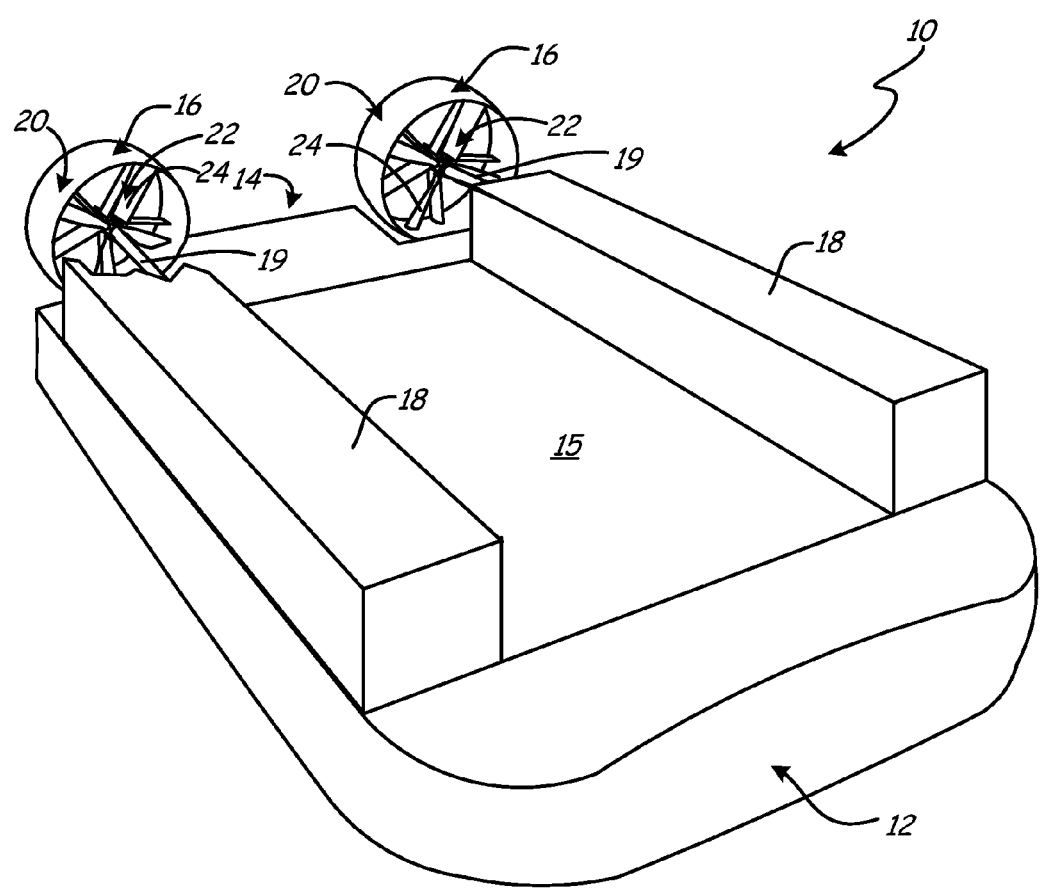
FIG. 1 is a perspective view of a watercraft according to the present invention.

FIG. 1 shows an example of a watercraft that would be used with the present invention. In the illustrative embodiment, the watercraft is hovercraft 10. Hovercraft 10 has front end 12, rear end 14, deck 15, propeller assemblies 16, engines 18, and propeller driveshafts 19. Deck 15 extends from front end 12 to rear end 14 and supports propeller assemblies 16 (located near rear end 14) and engines 18 (located near front end 12). Propeller driveshaft 19 connects each engine 18 with a respective propeller assembly 16. Each propeller assembly 16 includes duct assembly 20 and hub assembly 22. Duct assembly 20 provides structural support for propeller assembly 16 and assists with airflow. Hub assembly 22, which includes propeller blades 24, is coupled with propeller driveshaft 19. Propeller driveshaft 19 is rotatably driven by engine 18 to rotate hub assembly 22, particularly propeller blades 24. By rotating propeller blades 24, hovercraft 10 moves forward relative to the thrust force created as propeller blades 24 move air. The amount of this thrust is controlled by the rotational speed of propeller driveshaft 19 and the pitch of propeller blades 24.

Figure 2A:
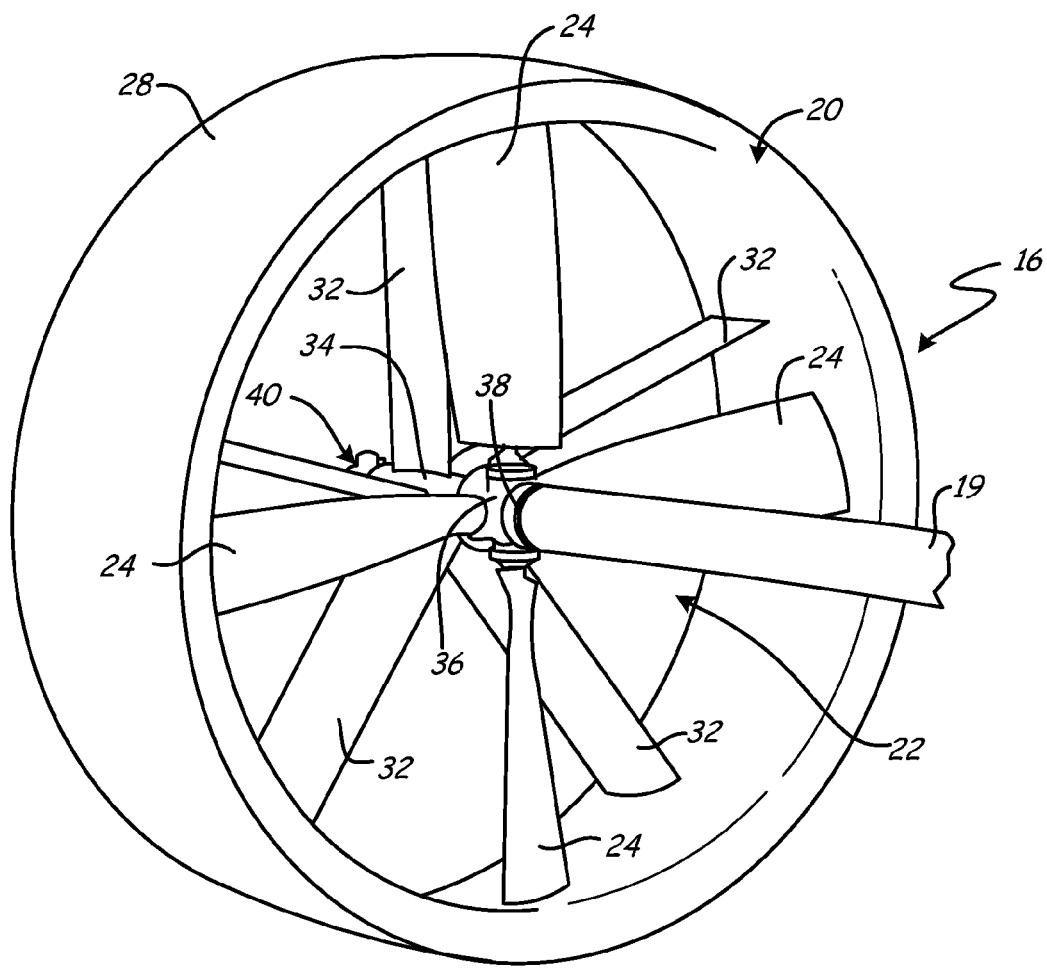
FIG. 2A is a perspective view of the shroud assembly of the present invention.
Figure 2B:
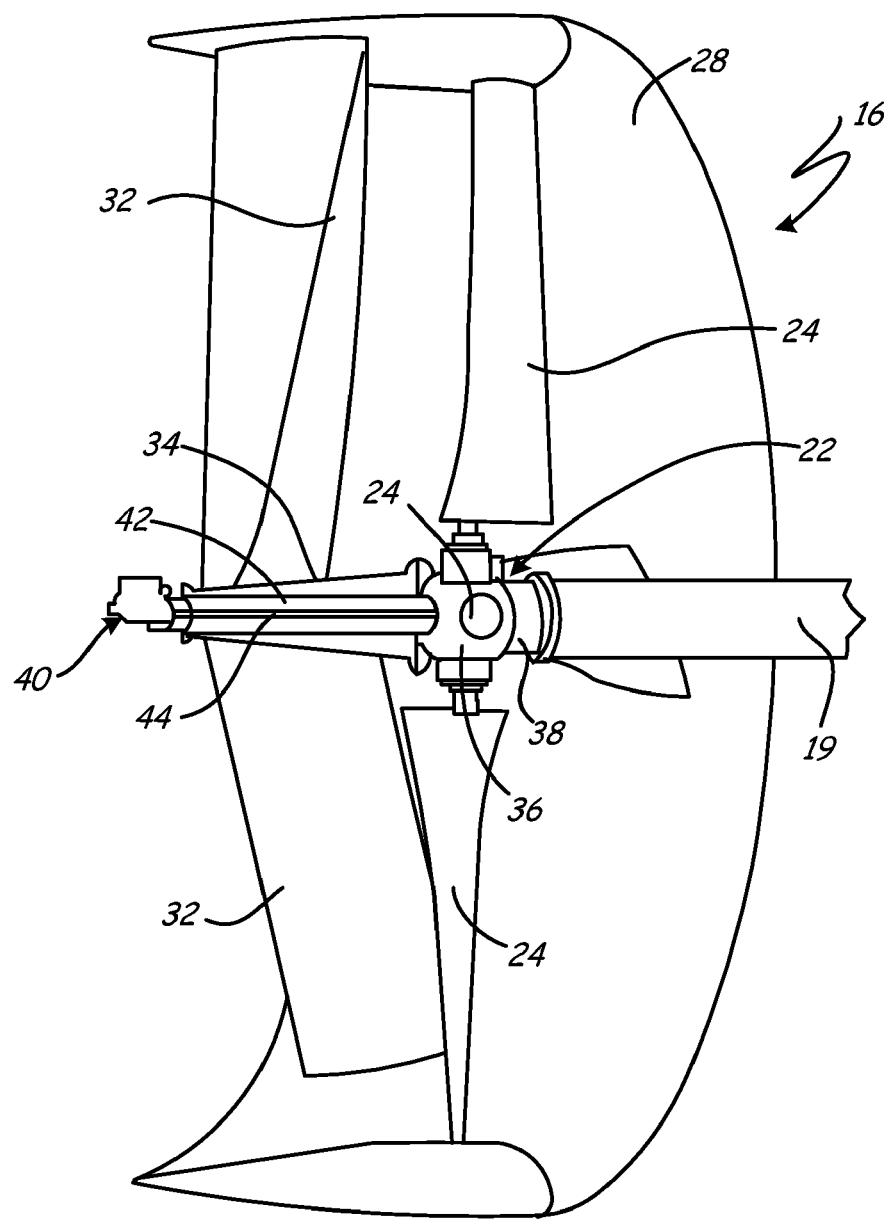
FIG. 2B is a cross-sectional view of the shroud assembly of the present invention.

FIGS. 2A and 2B show propeller assembly 16 of FIG. 1 in greater detail. FIG. 2A shows a perspective view of propeller assembly 16, which includes duct assembly 20 and hub assembly 22. Duct assembly 20 includes annular shroud 28, a plurality of struts 32, and shroud centerbody 34. Struts 32 connect annular shroud 28 with shroud centerbody 34 to promote a desired airflow profile and to provide structural support for hub assembly 22. Located at a first end of shroud centerbody 34 is hub assembly 22, which includes propeller blades 24, hub 36, and actuator 38. Hub 36 joins propeller blades 24 with actuator 38, which has chambers (not shown in FIG. 2A) that receive fluid. Depending on fluid pressure within actuator 38, the pitch of propeller blades 24 is variably adjusted in order to control thrust and movement of hovercraft 10.

As shown in FIG. 2B, at an opposite end of the shroud centerbody 34 from hub assembly 22 is valve assembly 40, which transfers fluid to and from hub assembly 22 in order to adjust fluid pressure within actuator 38 to increase or decrease the pitch of propeller blades 24. Within shroud centerbody 34 is propshaft 42, which connects hub assembly 22 with valve assembly 40. Because shroud centerbody 34 is a rigid structure and hub assembly 22 rotates with propeller driveshaft 19, propshaft 42 connects rotating hub assembly 22 with valve assembly 40, which does not rotate. Hydraulic fluid lines 44 within propshaft 42 allow valve assembly 40 to transfer hydraulic fluid to and from actuator 38 to adjust the pitch of propeller blades 24.

Figure 3:
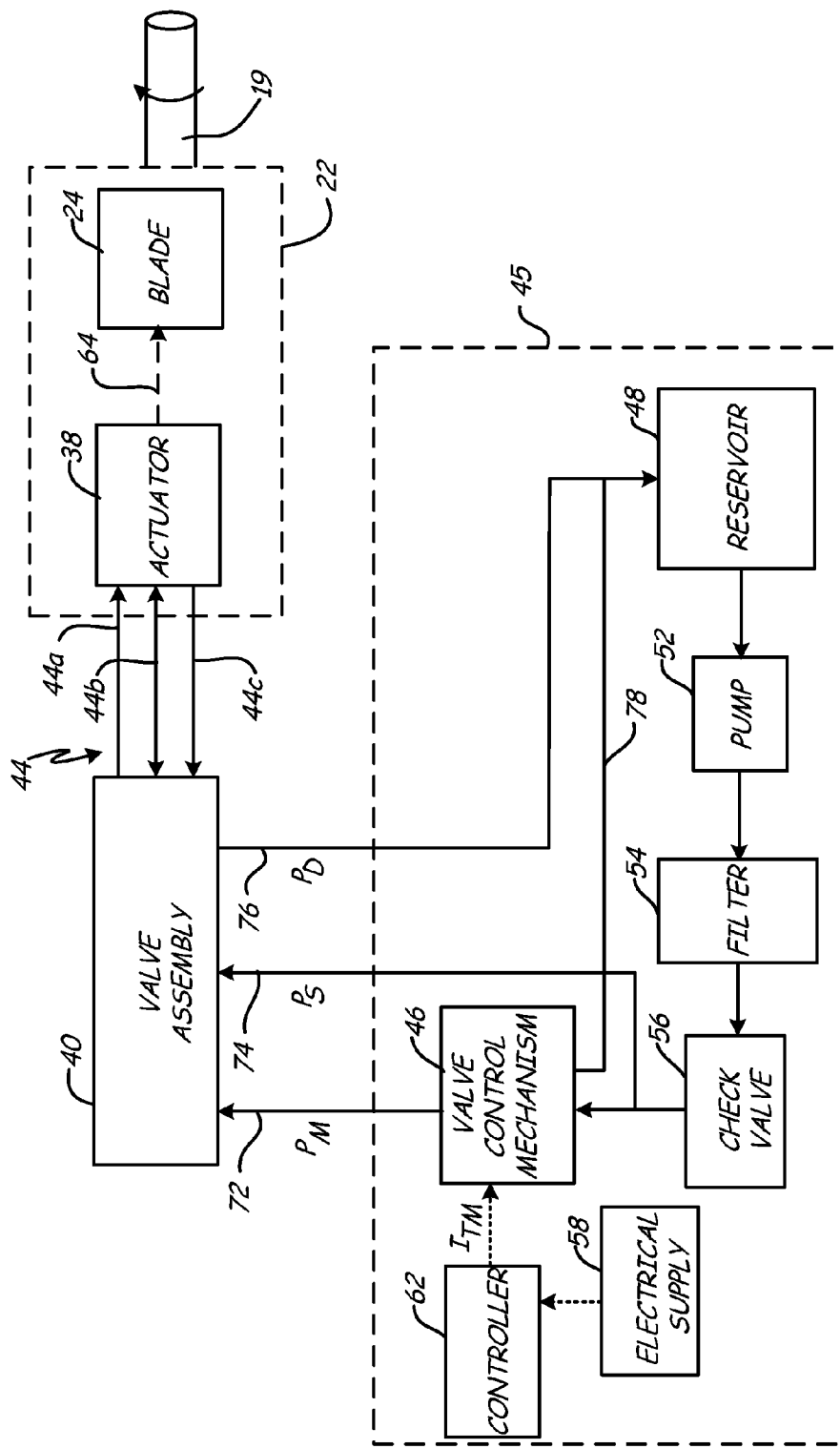
FIG. 3 is a block diagram of the present invention.

The block schematic diagram, FIG. 3, illustrates the system for adjusting the pitch of propeller blades 24. As a preliminary note, the solid line arrows in FIG. 3 denote hydraulic connections, the large dashed line arrows denote mechanical connections, and the finely dashed line arrows denote electrical connections.

FIG. 3 shows hub assembly 22 (which includes actuator 38 and blades 24 and is rotatably driven by propeller shaft 19), valve assembly 40, hydraulic fluid lines 44a-44c, and fluid supply assembly 45 (which includes valve control mechanism 46, reservoir 48, pump 52, filter 54, check valve 56, electrical supply 58 and controller 62). Hub assembly 22 (in particular, actuator 38) is in fluid communication with valve assembly 40. Actuator 38 is connected to valve assembly 40 with hydraulic lines 44a-44c, which send fluid from valve assembly 40 to actuator 38 and vice versa in order to increase or decrease the fluid pressure in actuator 38. Specifically, hydraulic line 44a transfers fluid from valve assembly 40 to actuator 38, hydraulic line 44b transfers fluid to and from actuator 38 and valve assembly 40, and hydraulic line 44c transfers fluid from actuator 38 to valve assembly 40. Depending on the fluid pressure in actuator 38, actuator 38 mechanically communicates with propeller blades 24 using mechanical connection 64 to adjust the pitch of propeller blades 24. Examples of mechanical connections 64 include any mechanism that can convert a linear motion to a rotational motion in order to rotate propeller blades 24, such as a piston in communication with a pin and roller assembly connected at an end of propeller blades 24.

In order for valve assembly 40 to transfer fluid to and from actuator 38 to adjust fluid pressure in actuator 38 and thus adjust the pitch of propeller blades 24, fluid supply assembly 45 supplies hydraulic fluid to valve assembly 40. Fluid supply assembly 45 is isolated from valve assembly 40 and hub assembly 22 in order to avoid damage caused by the harsh conditions of a saltwater environment. Three hydraulic lines 72, 74, 76 connect fluid supply assembly 45 with valve assembly 40. Hydraulic lines 72, 74 transfer fluid from fluid supply assembly 45 to valve assembly 40, and hydraulic line 76 returns fluid from valve assembly 40 to fluid supply assembly 45.

Fluid supply assembly 45 includes valve control mechanism 46, reservoir 48, pump 52, filter 54, check valve 56, electrical supply 58 and controller 62. Pump 52 pumps hydraulic fluid from reservoir 48 through filter 54 and check valve 56. Some of the hydraulic fluid bypasses valve control mechanism 46 and is transferred directly through hydraulic line 74 to valve assembly 40 at supply pressure, $P_S$ (which is a function of the properties of pump 52). The remaining hydraulic fluid goes through valve control mechanism 46. Controller 62 provides a desired input current, $I_{TM}$, to valve control mechanism 46 using current supplied by electrical supply 58. Based on input current $I_{TM}$, valve control mechanism 46 transfers hydraulic fluid through hydraulic line 72 to valve assembly 40 at metered pressure, $P_M$, which is proportional to $I_{TM}$. Thus, a variable hydraulic pressure control signal is created and transferred from valve control mechanism 46 through hydraulic line 72 to valve assembly 40. Valve control mechanism 46 also has drain line 78 to transfer excess fluid back to reservoir 54. Hydraulic line 76 also transfers excess fluid from valve assembly 40 back to reservoir 54 at drain pressure, $P_D$.

Therefore, there are three fluid pressures within valve assembly 40—$P_M$, $P_S$, $P_D$—that correspond with the three hydraulic lines 72, 74, 76 connecting valve assembly 40 with fluid supply assembly 45. Depending on the relative pressures $P_M$, $P_S$, $P_D$ within valve assembly 40, fluid is transferred from valve assembly 40 to actuator 38 (or vice versa) through hydraulic lines 44. Depending on the fluid pressure within actuator 38, mechanical connection 64 moves to either increase or decrease the pitch of propeller blades 24.

Figure 4:
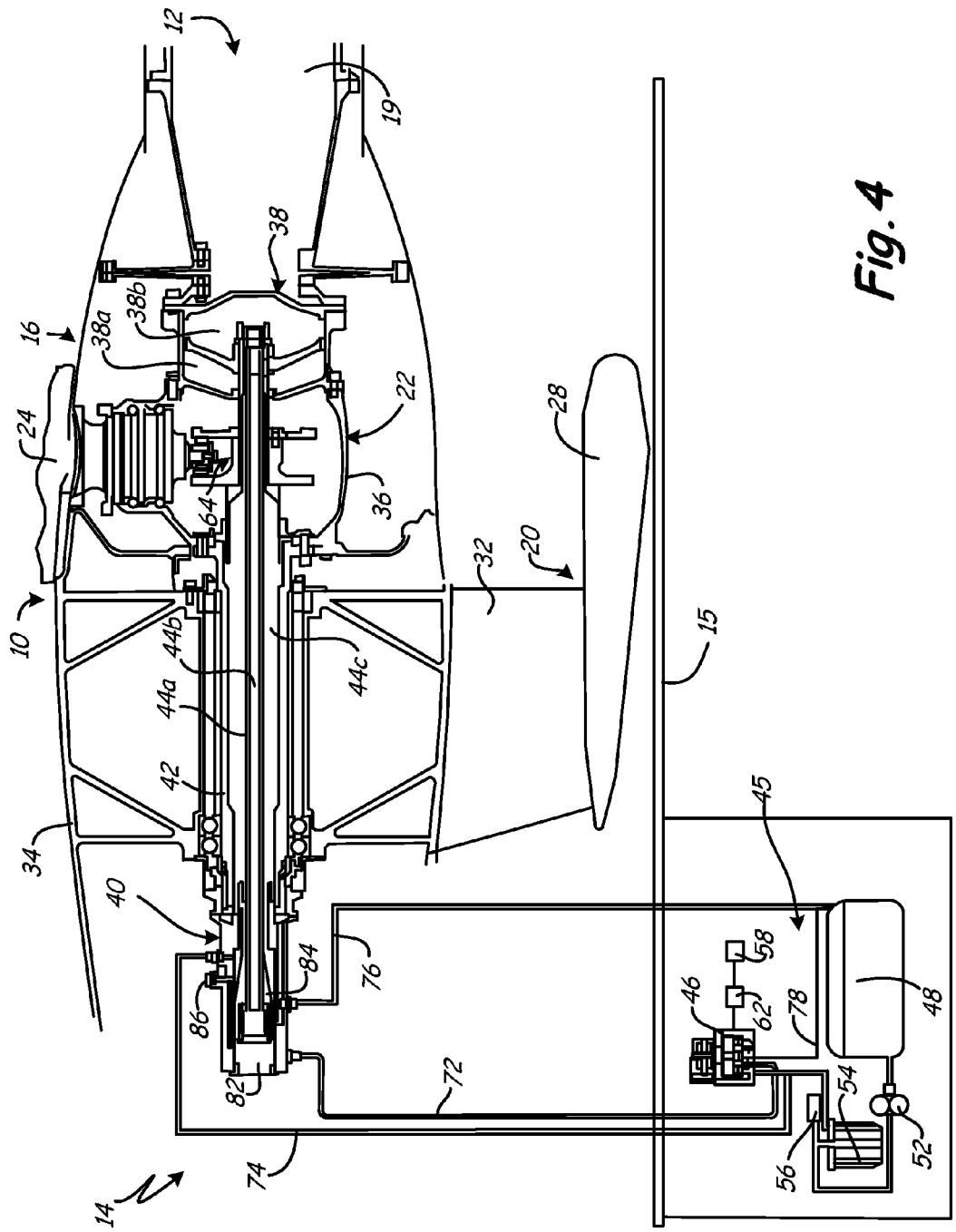
FIG. 4 is a cross-sectional view of an embodiment of the present invention.

FIG. 4 shows an illustrative embodiment of the invention shown in FIG. 3. As described previously, hovercraft 10 has front end 12, rear end 14, deck 15, propeller assembly 16, engine 18 (shown in FIG. 1), propeller shaft 19, valve assembly 40, propshaft 42, hydraulic lines 44a-44c, and fluid supply assembly 45. Deck 15 extends from front end 12 to rear end 14. Propeller shaft 19 connects engine 18 (shown in FIG. 1) with propeller assembly 16, which includes duct assembly 20 and hub assembly 22. Hub assembly 22 has hub 36, actuator 38, and propeller blades 24 connected to actuator 38 with mechanical connection 64. Actuator 38 has two chambers 38a, 38b for receiving fluid from hydraulic lines 44a-44c. Propshaft 42 connects hub assembly 22 with valve assembly 40. Hydraulic lines 44a-44c within propshaft 42 allow valve assembly 40 to transfer hydraulic fluid to and from chambers 38a, 38b in actuator 38 to adjust the pitch of propeller blades 24.

As shown in FIG. 4, fluid supply assembly 45 is located below deck 15 in order to isolate valve control mechanism 46 from exposure to water. Three hydraulic lines 72, 74, and 76 are the only connections required to connect the components below deck 15 (i.e., valve control mechanism 46) with the components above deck 15 (i.e., valve assembly 40). As described previously, fluid supply assembly 45 includes valve control mechanism 46, reservoir 48, pump 52, filter 54, check valve 56, electrical supply 58 and controller 62. In the illustrated embodiment, valve control mechanism 46 is an electrohydraulic servovalve. Pump 52 pumps hydraulic fluid from reservoir 48 through filter 54 and check valve 56. Some of the hydraulic fluid bypasses valve control mechanism 46 and is transferred directly through hydraulic line 74 to valve assembly 40. The remaining hydraulic fluid goes through valve control mechanism 46, where it is later transferred through hydraulic line 72 at pressure, $P_M$, which is proportional to input current, $I_{TM}$, supplied to valve control mechanism 46 by controller 62. Valve control mechanism 46 also has drain line 78 to transfer excess fluid back to reservoir 54. Hydraulic line 76 transfers excess fluid from valve assembly 40 back to reservoir 54 at drain pressure, $P_D$.

Valve assembly 40 includes first chamber 82, second chamber 83, piston pilot valve 84, and proportional valve 86. Valve assembly 40 is fluidly connected to actuator 38 with hydraulic lines 44a-44c and to fluid supply assembly 45 with hydraulic lines 72, 74, 76. Fluid from hydraulic line 72 enters first chamber 82 of valve assembly 40 at metered pressure, $P_M$, which is proportional to desired input current, $I_{TM}$. Fluid from hydraulic line 74 enters second chamber 83 of valve assembly 40 at supply pressure, $P_S$. Depending on the fluid pressures in first chamber 82 and second chamber 83, piston pilot valve 84 moves in the axial direction to transfer fluid to actuator 38. As piston pilot valve moves in the axial direction, fluid stored in second chamber 83 is transferred to actuator 38 through hydraulic lines 44a-44c to adjust the pitch of the propeller blades. Depending on the fluid pressure within chamber 38a relative to chamber 38b in actuator 38, mechanical connection 64 moves to either increase or decrease the pitch of propeller blades 24. Specifically, if the fluid pressure in chamber 38a is greater than in chamber 38b, mechanical connection 64 will move to increase the pitch of propeller blades 24. If fluid pressure in chamber 38b is greater than in chamber 38a, mechanical connection 64 will move to decrease the pitch of propeller blades 24. This will be described in more detail with respect to FIGS. 5A-5C.

Figure 5A:
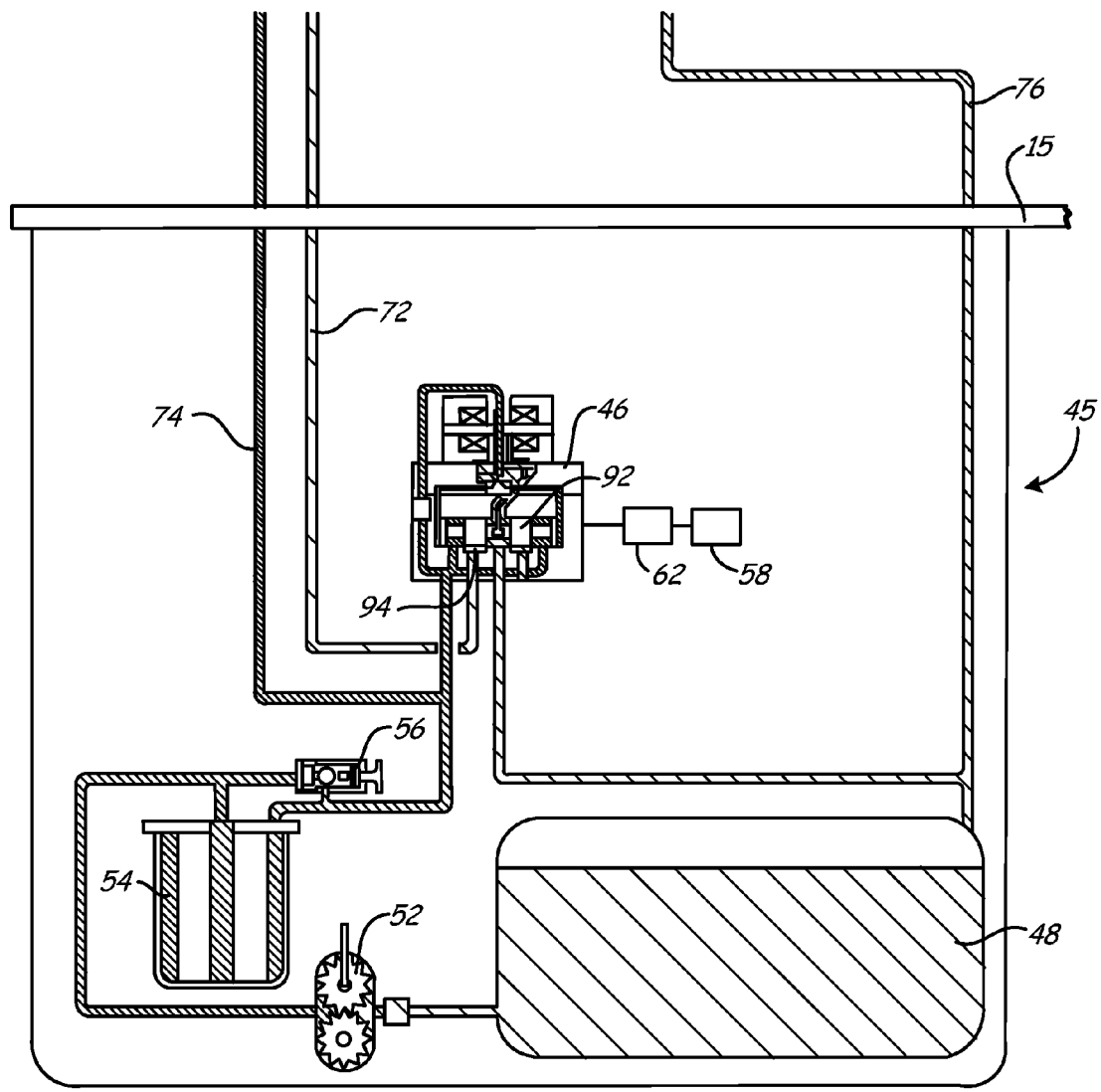
FIG. 5A is a cross-sectional view of the fluid supply assembly of the embodiment shown in FIG. 4.
Figure 5B:
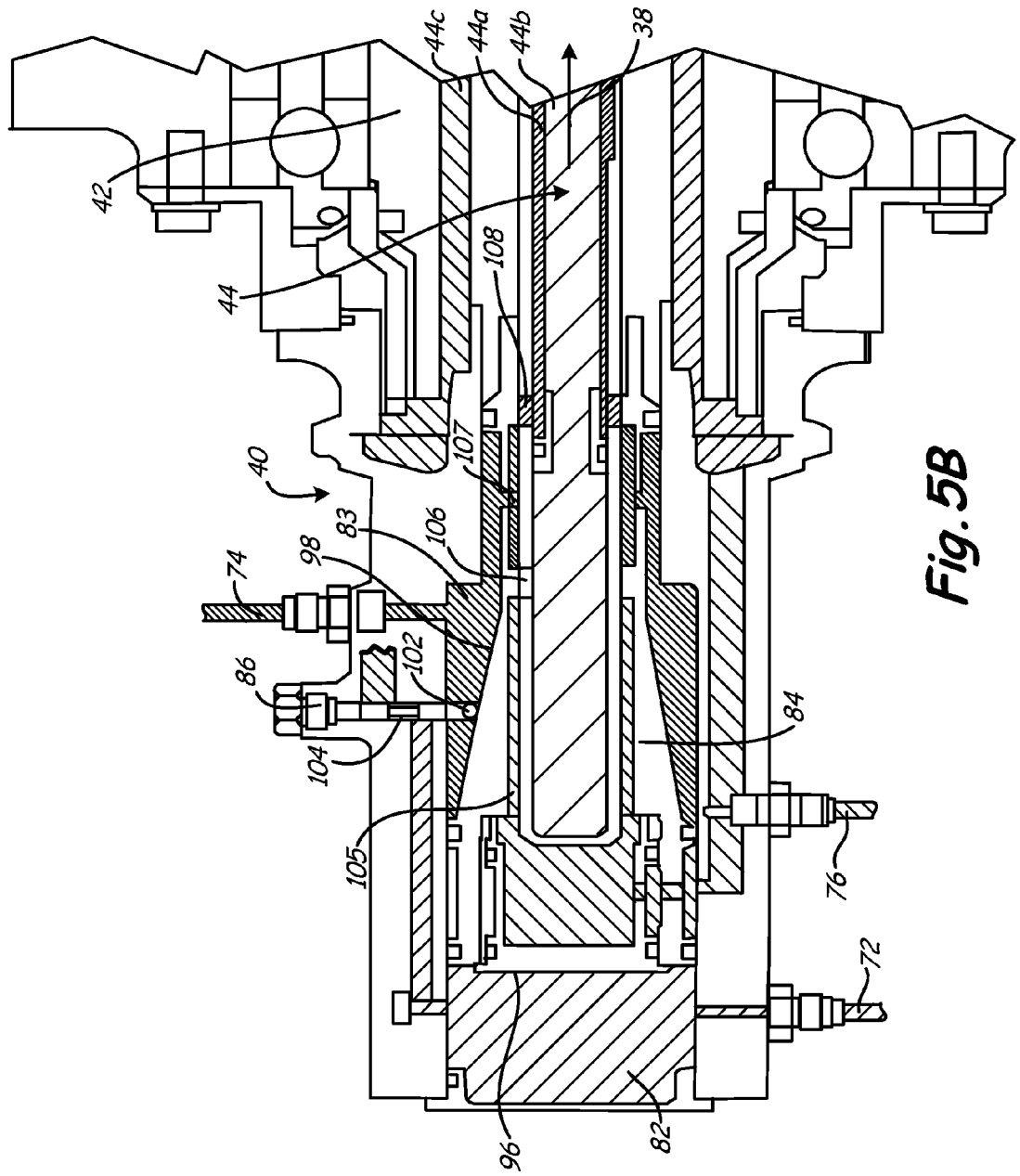
FIG. 5B is a cross-sectional view of the valve assembly of the embodiment shown in FIG. 4.
Figure 5C:
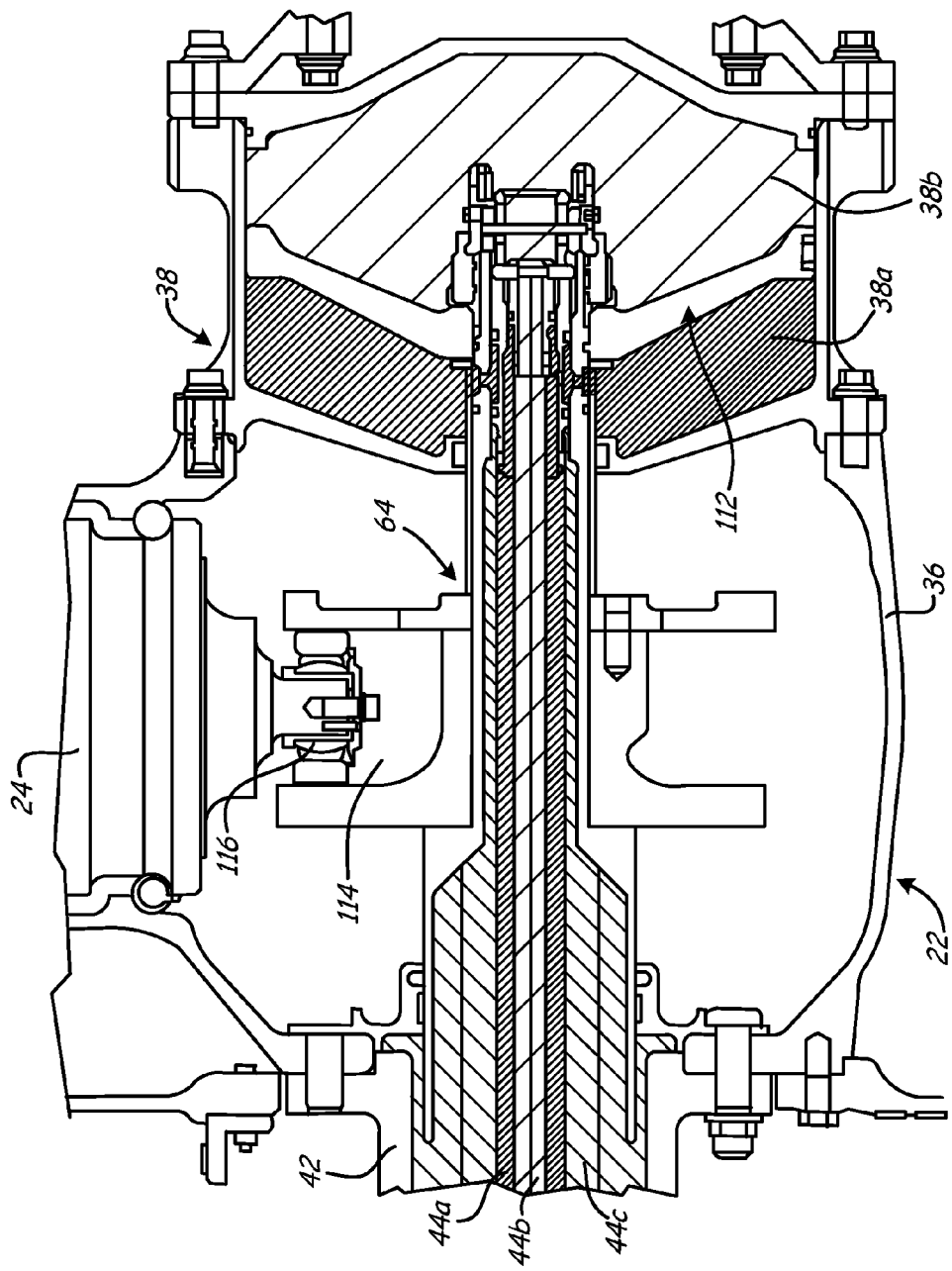
FIG. 5C is a cross-sectional view of the hub assembly of the embodiment shown in FIG. 4.

FIGS. 5A-5C show detailed views of the embodiment in FIG. 4. First, there will be a general discussion of each of FIGS. 5A-5C, followed by a discussion of how the system works when a user wishes to increase the pitch of propeller blades 24 and a discussion of how the system works when a user wishes to decrease the pitch of propeller blades 24.

FIG. 5A shows a detailed view of fluid supply assembly 45 from FIG. 4. Fluid supply assembly 45, as previously described, includes valve control mechanism 46, reservoir 48, pump 52, filter 54, check valve 56, electrical supply 58, and controller 62. Reservoir 48 contains hydraulic fluid at drain pressure, $P_D$. Pump 52 pumps hydraulic fluid from reservoir 48 through filter 54 and check valve 56 at supply pressure, $P_S$. Some of the hydraulic fluid bypasses valve control mechanism 46 and is transferred directly through hydraulic line 74 to valve assembly 40 at supply pressure, $P_S$. The remaining hydraulic fluid goes through valve control mechanism 46, which is an electrohydraulic servovalve in the illustrated embodiment.

With current from electrical supply 58, controller 62 sends an input current, $I_{TM}$, to valve control mechanism 46. Valve control mechanism 46 includes spool 92, which is positioned proportionally to the input current, $I_{TM}$. The position of spool 92 creates opening 94 having an area that is proportional to the input current, $I_{TM}$. As shown in FIG. 5A, opening 94 is closed, but as spool 92 moves in a first axial direction (e.g. to the right in FIG. 5A), opening 94 will open to receive fluid. Hydraulic fluid enters valve control mechanism 46 at supply pressure, $P_S$, and passes through opening 94 to create the variable hydraulic pressure control signal. Because the hydraulic fluid passes though opening 94, which is proportional to the input current, $I_{TM}$, the variable hydraulic pressure control signal is a function of the input current, $I_{TM}$, provided by controller 62. The variable hydraulic pressure control signal having pressure $P_M$ then passes through hydraulic line 72 to valve assembly 40.

FIG. 5B shows a more detailed view of valve assembly 40 from FIG. 4. FIG. 5B is shaded to show the relative pressures of each of the fluids in valve assembly 40.

As described above, valve assembly 40 includes first chamber 82, second chamber 83, piston pilot valve 84, and proportional valve 86. Piston pilot valve 84 includes drainage chamber 105 and opening 107. Piston pilot valve also has rear face 96 and front face 98. Also shown in this view is a first end of hydraulic lines 44a, 44b, 44c. Hydraulic line 44a has opening 106, which allows fluid to transfer to chamber 38a to increase the pitch of the actuator blades. Hydraulic line 44b has opening 108, which allows fluid to transfer to chamber 38b to decrease the pitch of the actuator blades. Hydraulic line 44c allows excess fluid in chamber 38a to return to valve assembly 40.

After exiting fluid supply assembly 45, fluid from hydraulic line 72 at metered pressure $P_M$ (i.e., the variable hydraulic pressure control signal) enters valve assembly 40, specifically first chamber 82. First chamber 82 is bounded on one side by rear face 96 of piston pilot valve 84. As previously discussed, hydraulic fluid at pressure $P_S$ is transferred from fluid supply assembly 45 through hydraulic line 74 and enters second chamber 83. Second chamber 83 is also bounded on one side by front face 98 of piston pilot valve 84. As fluid pressure increases in first chamber 82 relative to fluid pressure in second chamber 83, piston pilot valve 84 moves in a first axial direction (e.g., to the right in FIG. 5B). As fluid pressure decreases in first chamber 82 relative to second chamber 83, piston pilot valve 84 moves in a second axial direction (e.g., to the left in FIG. 5C).

Depending on the position of piston pilot valve 84, fluid in second chamber 83 (which is in fluid communication with opening 107) is transferred through either opening 106 or opening 108 to hydraulic line 44 to actuator 38. When piston pilot valve 84 moves in the first axial direction (i.e. to the right) depending on the variable pressure control signal, fluid in second chamber 83 passes through opening 107 and opening 108 to hydraulic line 44a, which then is transferred to chamber 38a in actuator 38 to increase pitch of propeller blades 24. When this happens, opening 106 allows excess fluid to transfer from hydraulic line 44b to drainage chamber 105, which then transfers the fluid through hydraulic line 76 to reservoir 48. When piston pilot valve 84 moves in the second axial direction (i.e. to the left) depending on the variable pressure control signal, fluid in second chamber 83 passes through opening 107 and opening 106 to hydraulic line 44b, which then is transferred to chamber 38b in actuator 38 to decrease pitch of propeller blades 24.

There are two ways that movement of piston pilot valve 84 is stopped. First, piston pilot valve 84 will stop moving when the force exerted by the fluid in first chamber 82 equals the force exerted by the fluid in second chamber 83. This force is dependent on the fluid pressure in chambers 82, 83 and the area of faces 96, 98 of piston pilot valve 84. For example, face 98 has an area that is about half the area of face 96. Therefore, when the fluid pressure in first chamber 82 is about half the fluid pressure in second chamber 83, the position of piston pilot valve 84 will remain fixed until fluid pressure in first chamber 82 either increases or decreases. In order to further control the movement of piston pilot valve 84, proportional valve 86 is provided. Proportional valve 86 includes tip 102, which contacts front face 98 as piston pilot valve 84 moves in an axial direction. Proportional valve 86 also includes an opening 104 having an area that increases or decreases as tip 102 rides along front face 98 while piston pilot valve 84 moves in the axial direction. Fluid in first chamber 82 must pass through opening 104 in order to drain back to reservoir 48 at pressure $P_D$. Therefore, fluid must pass through opening 94 in valve control mechanism 46 before entering first chamber 82 and must also pass through opening 104 in proportional valve 86 before returning to reservoir 48. As area of opening 94 increases as a result of an increase in input current, $I_{TM}$, fluid pressure, $P_M$, increases in first chamber 82 and piston pilot valve 84 moves in a first axial direction (e.g., to the right in FIG. 5B). As piston pilot valve 84 moves in the first axial direction, tip 102 of proportional valve 86 contacts front face 98 of piston pilot valve 84 and rides up front face 98. When the area of opening 104 is equivalent to the area of opening 94 of valve control mechanism 46, the system is in equilibrium. Piston pilot valve 84 stops moving until the area of opening 94 increases or decreases. As area of opening 94 decreases as a result of a decrease in input current, $I_{TM}$, fluid pressure, $P_M$, decreases in first chamber 82 and piston pilot valve 84 moves in a second axial direction (e.g., to the left in FIG. 5B). As piston pilot valve 84 moves in the second axial direction, tip 102 of proportional valve 86 contacts front face 98 of piston pilot valve 84 and rides down front face 98. When the area of opening 104 is equivalent to the area of opening 94 of valve control mechanism 46, the system is in equilibrium. Piston pilot valve 84 stops moving until the area of opening 94 increases or decreases.

Because the position of piston pilot valve 84 depends on the variable hydraulic pressure control signal, which is a function of the input current, $I_{TM}$, of valve control mechanism 46, the fluid transferred to actuator 38 is also a function of input current, $I_{TM}$. Because the fluid transferred to actuator 38 is a function of input current, $I_{TM}$, a controlled adjustment of the pitch of propeller blades 24 is achieved as will be discussed with respect to FIG. 5C.

FIG. 5C shows a detailed view of the hub assembly 22 of FIG. 4. Hub assembly 22 includes propeller hub 36, propeller blades 24, and actuator 38. Actuator 38 is connected to blades 24 with mechanical connection 64, which includes piston 112 having slots 114 (only one shown in FIG. 5C) that receive pin and roller assembly 116 that is attached at an end of each blade 24. When piston 112 moves in an axial direction, pin and roller assembly 116 rotates blade 24 to adjust the pitch. Actuator 38 also has chambers 38a, 38b that receive fluid from hydraulic lines 44a, 44b. Chamber 38a receives fluid from hydraulic line 44a, and chamber 38b receives fluid from hydraulic line, 44b. Depending on the fluid pressure in chamber 38a relative to chamber 38b, piston 112 moves in an axial direction and pin and roller assembly 116 rotates blade 24 to adjust the pitch. When fluid pressure in chamber 38a is greater than fluid pressure in chamber 38b, piston 112 moves in the first axial direction (i.e. to the right in FIG. 5C). Pin and roller assembly 116 then rotates in a first rotational direction to rotate blade 24 and increase the pitch of blade 24. When fluid pressure in chamber 38b is greater than fluid pressure in chamber 38a, piston 112 moves in the second axial direction (i.e to the left in FIG. 5C). Pin and roller assembly 116 then rotates in a second rotational direction to rotate blade 24 and decrease the pitch of blade 24.

As previously discussed, depending on the position of piston pilot valve 84 (which is a function of the variable hydraulic pressure control signal), hydraulic fluid is transferred to or from chambers 38a, 38b in actuator 38. As fluid pressure builds in one chamber (e.g., 38a), this may cause there to be excess fluid in the other chamber (e.g., 38b). Such excess fluid drains back at pressure $P_D$ either through hydraulic fluid line 44b or 44c to valve assembly 40, where it is drained through drain line 76 to reservoir 48 (shown in FIGS. 5A and 5B). Excess fluid in chamber 38a will exit through an opening (not shown) in communication with hydraulic fluid line 44c to valve assembly 40. Excess fluid in chamber 38b will exit through hydraulic fluid line 44b to drainage chamber 105 in valve assembly 40.

Referring again to FIGS. 5A-5C, when a user wants to increase the pitch of propeller blade 24, controller 62 sends input signal $I_{TM}$ to valve control mechanism 46, shown in FIG. 5A. Spool 92 moves in a first axial direction (e.g., to the right in FIG. 5A) to increase the area of opening 94 until the area of opening 94 is proportional with $I_{TM}$. As the area of opening 94 increases, the variable hydraulic pressure control signal increases and fluid pressure $P_M$ increases in first chamber 82. As shown in FIG. 5B, piston pilot valve 84 moves in the first axial direction (e.g., to the right in FIG. 5B) proportionally to the variable hydraulic pressure control signal (which is proportional to input signal $I_{TM}$). As piston pilot valve 84 moves in the first axial direction, opening 107 in piston pilot valve 84 is in fluid communication with opening 108 in hydraulic line 44a, and fluid is transferred from second chamber 83 in piston pilot valve 84 to chamber 38a in actuator 38 through hydraulic fluid line 44a. As shown in FIG. 5C, pressure in chamber 38a increases and piston 112 moves in the first axial direction (e.g., to the right in FIG. 5C). As piston 112 moves in the first axial direction, pin and roller assembly 116 rotates in a first rotational direction to increase the pitch of propeller blade 24.

While pressure in chamber 38a increases and piston 112 moves in the first axial direction, fluid is pushed out of chamber 38b and through hydraulic line 44b. As shown in FIG. 5B, when piston pilot valve 84 has moved in the first axial direction, opening 106 in hydraulic line 44b is in fluid communication with drainage chamber 105. The fluid pushed out of chamber 38b by the movement of piston 112 is released through opening 106 in hydraulic line 44a and into drainage chamber 105, where it is drained through hydraulic line 76 to reservoir 48 at pressure $P_D$.

Also, while piston pilot valve 84 is moving in the first axial direction (e.g., to the right in FIG. 5B), proportional valve 86 rides up front face 98 of piston pilot valve 84 and the area of opening 104 increases. When the area of opening 104 is equivalent to the area of opening 94 of the valve control mechanism, the system is in equilibrium and piston pilot valve 84 stops moving until the area of opening 94 increases or decreases. The system will also reach equilibrium, as previously described, when the force exerted by the fluid in first chamber 82 equals the force exerted by the fluid in second chamber 83.

When a user wants to decrease the pitch of propeller blade 24, controller 62 sends input signal $I_{TM}$ to valve control mechanism 46. Spool 92 moves in a second axial direction (e.g. to the left in FIG. 5A) to decrease the area of opening 94 until the area of opening 94 is proportional with $I_{TM}$. As the area of opening 94 decreases, the variable hydraulic pressure control signal decreases and fluid pressure $P_M$ decreases in first chamber 82. Piston pilot valve 84 moves in the second axial direction (e.g., to the left in FIG. 5B) proportionally to the variable hydraulic pressure control signal (which is proportional to input signal $I_{TM}$). As piston pilot valve 84 moves in the second axial direction, opening 107 in piston pilot valve 84 is in fluid communication with opening 106 in hydraulic line 44b, and fluid is transferred from second chamber 83 in piston pilot valve 84 to chamber 38b in actuator 38 through hydraulic line 44b. As shown in FIG. 5C, pressure in chamber 38b increases and piston 112 moves in the second axial direction (e.g., to the left in FIG. 5C). As piston 112 moves in the second axial direction, pin and roller assembly 116 rotates in second rotational direction to decrease the pitch of propeller blade 24.

While pressure in chamber 38b increases and piston 112 moves in the second axial direction, fluid is pushed out of chamber 38a through hydraulic line 44c. As shown in FIG. 5B, this fluid is sent back to valve assembly 40 through hydraulic line 44c and transferred through hydraulic line 76 back to reservoir 48 at pressure $P_D$.

While piston pilot valve 84 is moving in the second axial direction (e.g., to the left in FIG. 5B), proportional valve 86 rides down front face 98 of piston pilot valve 84 and the area of opening 104 increases. When the area of opening 104 is equivalent to the area of opening 94 of valve control mechanism 46, the system is in equilibrium and piston pilot valve 84 stops moving. The system will also reach equilibrium, as previously described, when the force exerted by the fluid in first chamber 82 equals the force exerted by the fluid in second chamber 83.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for adjusting the pitch of a variable pitch propeller, the system comprising:
   a duct assembly mounted to an exterior of a deck of a vehicle;
   a hub assembly disposed within the duct assembly, the hub assembly comprising:
      a hub rotatably driven by a propeller shaft extending from an engine mounted to the vehicle;
      an actuator connected to the hub; and
      a plurality of propeller blades connected to the actuator with at least one mechanical connection;
   a valve assembly disposed within the duct assembly and in fluid communication with the actuator, the valve assembly comprising:
      a piston pilot valve; and
      a proportional valve having a tip that contacts the piston pilot valve, wherein an opening is created within the proportional valve depending on a location of the tip; and
   a fluid supply assembly in fluid communication with the valve assembly through a plurality of hydraulic lines extending through the deck, the fluid supply assembly comprising a valve control mechanism isolated from the valve assembly and the hub assembly within an interior of the deck;
   wherein the valve control mechanism provides a variable hydraulic pressure control signal to the valve assembly, the valve assembly transfers fluid to the actuator as a function of the variable hydraulic pressure control signal, and the mechanical connection adjusts the pitch of the propeller blades relative to fluid pressure in the actuator.

2. The system of claim 1, wherein the valve control mechanism is an electro-hydraulic servovalve.

3. The system of claim 2, the valve control mechanism further comprising:
   an electrical supply; and
   a controller for providing an input current that is proportional to the variable hydraulic pressure control signal.

4. The system of claim 3, wherein the input current determines a position of a spool within the valve control mechanism, which creates an opening proportional to the input current, and fluid passes through the opening and is transferred to the valve assembly at a first pressure to create the variable hydraulic pressure control signal.

5. The system of claim 1, wherein: the piston pilot valve includes a front face and a rear face; and the valve assembly further comprises:
   a first chamber bounded on a first side by the rear face of the piston pilot valve; and
   a second chamber bounded on a first side by the front face of the piston pilot valve;
   wherein the first chamber receives the variable hydraulic pressure control signal from the valve control mechanism, the second chamber receives fluid from the fluid supply assembly, and the piston pilot valve axially moves relative to a difference in fluid pressures between the first chamber and the second chamber.

6. The system of claim 5, wherein movement of the piston pilot valve causes fluid from the second chamber to be transferred to the actuator through a hydraulic line.

7. The system of claim 5, wherein movement of the piston pilot valve in an axial direction stops when fluid pressure in the first chamber is about half the fluid pressure in the second chamber.

8. The system of claim 5 wherein:
   the tip contacts the front face of the piston pilot valve.

9. The system of claim 8, wherein, as the piston pilot valve moves in a first axial direction, the opening within the proportional valve increases and as the piston pilot valve moves in a second axial direction the opening within the proportional valve decreases.

10. The system of claim 9, wherein fluid within the first chamber is transferred through the opening in the proportional valve and back to a reservoir of the fluid supply assembly.

11. The system of claim 1, wherein the fluid supply assembly further comprises:
   a reservoir; and
   a pump for pumping a first portion of fluid from the reservoir to the valve control mechanism and a second portion of fluid from the reservoir to the valve assembly.

12. The system of claim 1, the mechanical connection comprising:
   a piston connected with the actuator that moves in an axial direction depending on fluid pressure within the actuator, the piston having a slot for each propeller blade; and
   a pin and roller assembly connected to an end of each propeller blade and received within the slot in the piston.

13. The system of claim 10, wherein when fluid pressure is greater in a first chamber of the actuator than in a second chamber of the actuator, the piston moves in a first axial direction and the pin and roller assembly rotates in a first rotational direction to decrease the pitch of the propeller blade; and wherein when the fluid pressure is greater in the second reservoir of the actuator than in the first reservoir of the actuator, the piston moves in a second axial direction and the pin and roller assembly rotates in a second rotational direction to increase the pitch of the propeller blade.

14. A system for adjusting the pitch of a variable pitch propeller, the system comprising:
   a hub assembly comprising:
      a hub rotatably driven by a propeller shaft;
      an actuator connected to the hub and having a first actuator chamber and a second actuator chamber; and
      a plurality of propeller blades connected to the actuator with at least one mechanical connection;
   a valve assembly in fluid communication with the actuator, the valve assembly comprising:
      a piston pilot valve having a front face and a rear face;
      a first piston chamber bounded on one side by the rear face of the piston pilot valve;
      a second piston chamber bounded on one side by the front face of the piston pilot valve; and
      a proportional valve having a tip that contacts the front face of the piston pilot valve, wherein an opening is created within the proportional valve depending on a location of the tip; and
   a fluid supply assembly in fluid communication with the valve assembly; the fluid supply assembly comprising:
      a valve control mechanism comprising:
         an electrohydraulic servovalve that is electrically isolated from the valve assembly;
         an electrical supply;

a controller for providing an input current to the electrohydraulic servovalve that is proportional to the variable hydraulic pressure control signal;

a fluid supply reservoir in fluid communication with the opening in the proportional valve so that fluid from the first piston chamber is transferred back to the fluid supply reservoir of the fluid supply assembly through the opening; and a pump that pumps fluid from the fluid supply reservoir to the valve control mechanism and the second valve chamber of the valve assembly;

wherein the valve control mechanism transfers the variable hydraulic pressure control signal to the first valve chamber of the valve assembly to move the piston pilot valve, and the valve assembly transfers fluid to the actuator as a function of the variable hydraulic pressure control signal, which causes movement of the mechanical connection to adjust the pitch of the propeller blades.

15. The system of claim 14, the mechanical connection comprising:

a piston connected with the actuator that moves in an axial direction depending on fluid pressure within the actuator, the piston having a slot for each propeller blade; and a pin and roller assembly connected to an end of each propeller blade and received within the slot in the piston.

16. The system of claim 14, wherein when fluid pressure is greater in the first actuator chamber of the actuator than in the second actuator chamber of the actuator, the piston moves in a first axial direction and the pin and roller assembly rotates in a first rotational direction to decrease the pitch of the propeller blade; and wherein when the fluid pressure is greater in the second actuator chamber of the actuator than in the first actuator chamber of the actuator, the piston moves in a second axial direction and the pin and roller assembly rotates in a second rotational direction to increase the pitch of the propeller blade.

17. The system of claim 14, wherein, as the piston pilot valve moves in a first axial direction, the opening within the proportional valve increases and as the piston pilot valve moves in a second axial direction, the opening within the proportional valve decreases.

18. A method of adjusting the pitch of a variable pitch propeller for a watercraft in an aqueous environment, the method comprising:

sending an input signal to a valve control mechanism isolated from the water environment to create a variable hydraulic pressure control signal that is a function of the input signal of the valve control mechanism, the valve control mechanism receiving hydraulic fluid from a fluid source;

transferring the variable hydraulic pressure control signal to a valve assembly comprising a piston pilot valve;

sending a direct fluid supply to the piston pilot valve from the fluid source;

axially moving the piston pilot valve relative to the variable hydraulic pressure control signal to variably transfer the direct fluid supply from the piston pilot valve to an actuator in communication with a blade of the variable pitch propeller; and increasing fluid pressure in a first chamber of the actuator with the direct fluid supply relative to a second chamber of the actuator to mechanically rotate the blade and adjust the pitch of the blade.

19. The method of claim 18, wherein the valve control mechanism is an electrohydraulic servovalve.

20. A system for adjusting the pitch of a variable pitch propeller, the system comprising:

a hub assembly comprising:
  a hub rotatably driven by a propeller shaft;
  an actuator connected to the hub; and
  a plurality of propeller blades connected to the actuator with at least one mechanical connection;

a valve assembly in fluid communication with the actuator, the valve assembly comprising:
  a piston pilot valve having a front face and a rear face;
  a first chamber bounded on a first side by the rear face of the piston pilot valve;
  a second chamber bounded on a first side by the front face of the piston pilot valve; and
  a proportional valve having a tip that contacts the front face of the piston pilot valve, wherein an opening is created within the proportional valve depending on a location of the tip; and a fluid supply assembly in fluid communication with the valve assembly, the fluid supply assembly comprising a valve control mechanism isolated from the valve assembly and the hub assembly;

wherein the valve control mechanism provides a variable hydraulic pressure control signal to the valve assembly, the valve assembly transfers fluid to the actuator as a function of the variable hydraulic pressure control signal, and the mechanical connection adjusts the pitch of the propeller blades relative to fluid pressure in the actuator; and wherein the first chamber receives the variable hydraulic pressure control signal from the valve control mechanism, the second chamber receives fluid from the fluid supply assembly, and the piston pilot valve axially moves relative to a difference in fluid pressures between the first chamber and the second chamber.

21. The system of claim 20, wherein, as the piston pilot valve moves in a first axial direction, the opening within the proportional valve increases and as the piston pilot valve moves in a second axial direction the opening within the proportional valve decreases.

22. The system of claim 21, wherein fluid within the first chamber is transferred through the opening in the proportional valve and back to a reservoir of the fluid supply assembly.

23. The system of claim 20, wherein the fluid supply assembly further comprises:

a reservoir; and a pump for pumping a first portion of fluid from the reservoir to the valve control mechanism and a second portion of fluid from the reservoir to the valve assembly.

* * * * *